UNITED STATES PATENT OFFICE.

DAVID S. WOOD, OF TISKILWA, ILLINOIS.

IMPROVEMENT IN OCHERS FOR PAINTS.

Specification forming part of Letters Patent No. 106,643, dated August 23, 1870; Reissue No. 4,159, dated October 18, 1870.

*To all whom it may concern:*

Be it known that I, DAVID S. WOOD, of Tiskilwa, in the county of Bureau and State of Illinois, have discovered and compounded a useful Improvement in Umber Colors and Paints; and I do hereby declare that the following is a full and exact description thereof, which will enable those skilled in the art to make and use the same, reference being had to the following-named ingredients, their component parts, and how they are compounded.

Turkey umber—the article now generally used for coloring raw wood—is composed of silica, alumina, oxide of iron, manganese, and water, all of which are found in one bed, in the condition known as raw umber, in the United States.

The object of the present invention is to produce a similar umber, and equally as good, by combining terra sienna, found in the United States—as, for instance, in Bureau county and adjacent districts in the State of Illinois—and also to produce paints of one color or various colors.

The earthy substance found there in a state of nature is not combined, like the umber found in Turkey, but lies in strata of different distinct colors. In one stratum is found yellow sienna, in another black sienna, and in a third a brown or purplish-red sienna, any one of which contains, as found by analysis, all of the elements of Turkish umber, the difference consisting in the state which the oxide of iron is in.

When the yellow is properly burned it becomes red, the purplish-red becomes darker red or brown, the black turns blacker. Now, these several earthy substances cannot be used for staining various colors unless combined, and in order to make umber equal to the best in use and of a similar shade, I add to black sienna about one-fourth part of red. To make Vandyke brown, add one part of red to seven parts of black. Raw umber is composed of about two parts of black to one part of yellow. No positive proportion, however, can be given, as the color in the strata in some instances varies. The artist, however, can get the desired shade as readily as in other colors.

For a paint, the black sienna, when burned, ground, and prepared in linseed-oil, or other suitable oleaginous substance, produces a very fine color, and gives a lasting hard body, without the use of white lead, being adapted to the finest finish. The brown sienna can also be used as a paint when prepared similarly to the black sienna, making equally as fine a finish.

By combining the brown and black various shades of paint are produced, which are superior to ordinary ocher.

The above formula has been given so as to produce two well-known colors; but by changing the proportions a variety of dark colors may be obtained for graining, shading, &c., similar to foreign umbers now in use in this country.

I claim—

1. The black and brown siennas, prepared as set forth, and used separately or combined as a paint.

2. An umber compounded and prepared from the various colors set forth.

DAVID S. WOOD.

Witnesses:

WM. F. DUNN,

S. B. LINDSLEY.